(12) United States Patent
Spivakovsky et al.

(10) Patent No.: US 10,404,868 B2
(45) Date of Patent: Sep. 3, 2019

(54) IMAGE DEFECT DETECTION

(71) Applicant: HP INDIGO B.V., Amstelveen (NL)

(72) Inventors: Alexander Spivakovsky, Beit-Shemesh (IL); Oded Perry, Ness Ziona (IL); Oren Haik, Ness Ziona (IL); Avi Malki, Pethch Tikva (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 15/569,262

(22) PCT Filed: Jul. 15, 2015

(86) PCT No.: PCT/EP2015/066213
§ 371 (c)(1),
(2) Date: Oct. 25, 2017

(87) PCT Pub. No.: WO2017/008854
PCT Pub. Date: Jan. 19, 2017

(65) Prior Publication Data
US 2018/0131815 A1    May 10, 2018

(51) Int. Cl.
*G06K 9/32* (2006.01)
*H04N 1/00* (2006.01)
(Continued)

(52) U.S. Cl.
CPC ......... *H04N 1/00037* (2013.01); *G06K 9/036* (2013.01); *G06K 9/3233* (2013.01);
(Continued)

(58) Field of Classification Search
CPC ............. H04N 1/00015; H04N 1/6036; H04N 1/00002; H04N 1/00005; H04N 1/19505; H04N 1/19515; H04N 1/19584; H04N 1/3876; H04N 2209/048; H04N 5/23238; H04N 5/3415; H04N 9/045; H04N 9/093; H04N 1/00031; H04N 1/00047;
(Continued)

(56) References Cited

U.S. PATENT DOCUMENTS 5,305,392 A    4/1994   Longest et al.
7,030,400 B2   4/2006   Rivera et al.
(Continued)

OTHER PUBLICATIONS

Shankar, N.G. et al., "On-line Defect Detection in Web Offset Printing", Jun. 12, 2003. Available online at: http://ieeexplore.ieee.org/xpl/login.jsp?tp=&arnumber=1595132&url=http%3A%2F%2Fieeexplore.ieee.org%2Fxpls%2Fabs_all.jsp%3Farnumber%3D1595132.

*Primary Examiner* — Negussie Worku
(74) *Attorney, Agent, or Firm* — HP Inc. Patent Department (57) ABSTRACT

Apparatus to detect a defect in a printed image and methods of detecting detects in a printed image are described. In some examples, a printing operation is initiated using image data to generate a printed image. The printed image is then scanned to generate a scanned image. A resolution of the scanned image is estimated, calculated or determined on the basis of a characteristic of the printing operation, and a reference image, having a resolution corresponding to the estimated, calculated or determined resolution, is generated from the image data. Whether defects are present in the printed image may be determined on the basis of a comparison of the reference image with the scanned image.

17 Claims, 6 Drawing Sheets

(51) Int. Cl.
*G06K 9/03* (2006.01)
*G06K 9/62* (2006.01)
*H04N 1/409* (2006.01)

(52) U.S. Cl.
CPC ....... *G06K 9/6202* (2013.01); *H04N 1/00015* (2013.01); *H04N 1/00034* (2013.01); *H04N 1/4097* (2013.01)

(58) Field of Classification Search
CPC ................. H04N 1/4092; H04N 1/444; H04N 2201/0005; H04N 2201/0094; H04N 1/00029; H04N 1/00045; H04N 1/0005; H04N 1/00063; H04N 1/00082; H04N 1/3878; H04N 1/6027; H04N 2201/0082; H04N 1/0034; H04N 1/0039; H04N 1/00053; H04N 1/00058; H04N 1/00068; H04N 1/00076; H04N 1/00087; H04N 1/00204; H04N 1/00244; H04N 1/00326; H04N 1/00347; H04N 1/00843; H04N 1/00875; H04N 1/2307; H04N 1/32219; H04N 1/32256; H04N 1/40; H04N 1/40068; H04N 1/4055; H04N 1/4097; H04N 1/4413; H04N 1/4426; H04N 1/6005; H04N 1/6033; H04N 1/6038; H04N 1/6041; H04N 1/6072; H04N 1/6097; H04N 2201/0039; H04N 2201/0081; H04N 2201/0084; H04N 5/23293; G06K 15/027; G06K 9/52; G06K 9/00483; G06K 9/036; G06K 2209/19; G06K 9/2063; G06K 9/4604; G06K 9/3216; G06K 9/6202; G06K 15/005; G06K 15/02; G06K 15/186; G06K 2209/01; G06K 2209/053; G06K 9/00442; G06K 9/2054; G06K 9/32; G06K 9/3233; G06K 9/46; G06K 9/6203; G06K 9/6206; G06K 9/6212; G06K 9/6232; G06K 9/74

USPC ....... 382/112, 149, 144, 141, 284, 145, 275, 382/100, 128, 151, 195, 209, 217, 218, 382/254, 260, 274, 294; 358/1.14, 1.13, 358/1.9, 1.12, 1.8, 3.06, 3.27, 3.28, 406, 358/504, 521; 399/15

See application file for complete search history.

(56) References Cited

U.S. PATENT DOCUMENTS

| | | | |
|---|---|---|---|
| 7,570,796 B2 * | 8/2009 | Zafar | G03F 1/84 |
| | | | 382/144 |
| 7,783,122 B2 | 8/2010 | Wu et al. | |
| 8,780,378 B2 | 7/2014 | Yamamoto | |
| 2011/0069894 A1 * | 3/2011 | Vans | G06K 9/036 |
| | | | 382/218 |
| 2012/0070040 A1 * | 3/2012 | Vans | B41F 33/0036 |
| | | | 382/112 |
| 2013/0044347 A1 * | 2/2013 | Kitai | H04N 1/4092 |
| | | | 358/1.14 |
| 2013/0187970 A1 * | 7/2013 | Inoue | B41J 2/12 |
| | | | 347/14 |
| 2014/0079292 A1 | 3/2014 | Kaneko et al. | |
| 2014/0079293 A1 * | 3/2014 | Kitai | G06T 7/001 |
| | | | 382/112 |
| 2014/0126819 A1 | 5/2014 | Doepke et al. | |
| 2014/0146370 A1 * | 5/2014 | Banner | G06K 9/6232 |
| | | | 358/406 |
| 2014/0294248 A1 * | 10/2014 | Tanikawa | B41J 2/2142 |
| | | | 382/112 |
| 2014/0341437 A1 * | 11/2014 | Araki | G06T 7/001 |
| | | | 382/112 |
| 2015/0003845 A1 * | 1/2015 | Morishita | G03G 15/5062 |
| | | | 399/15 |
| 2015/0078627 A1 * | 3/2015 | Fukase | G06T 7/001 |
| | | | 382/112 |
| 2015/0294248 A1 * | 10/2015 | Deibler | G06Q 10/06311 |
| | | | 705/7.12 |
| 2018/0096472 A1 * | 4/2018 | Ukishima | H04N 1/6041 |
| 2018/0227463 A1 * | 8/2018 | Fukase | H04N 1/6036 |

* cited by examiner

IMAGE DEFECT DETECTION

BACKGROUND

Defects in printed images can be caused by a number of factors such as anomalies in print media, interactions between print media and marking material, systematic errors introduced by print mechanisms, and human error. Image defects may include but not be limited to scratches, spots, missing dot clusters, streaks, and banding.

BRIEF DESCRIPTION OF THE DRAWINGS

Various features of the present disclosure will be apparent from the detailed description which follows, taken in conjunction with the accompanying drawings, which together illustrate, just by way of example, features of the present disclosure, and wherein.

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

In-line inspection systems may detect defects by comparing scanned printed images with digital reference images. In one image reference approach, a reference exists that allows a direct comparison between a potentially defective image and a corresponding reference image. In some cases, 100% of the potentially defective image is inspected. A more elaborate referential approach involves recognizing features of potentially defective items in images and comparing those features with a set of idealized or perfect features. Inspection coverage on potentially defective items can vary in this case and may not necessarily be 100%.

The reference image is provided in a format suitable for the defect detection process. In order to compare the scanned image with the reference image in a way that is less likely to either miss defects or present false alarms, a registration process may be performed in which the scanned image is aligned with the reference image. In an inspection system for a sheet-fed printing press, page limits and/or fiduciary marks may be used to align the scanned image with reference image.

The respective resolutions of the reference image and the scanned image may be matched by down-scaling the resolution of the reference image to match the image resolution produced by the scanner, up-scaling the scanned image to match the resolution of the reference image, or processing both the reference image and the scanned image to conform to a mutual format and resolution.

In an inspection system for a sheet-fed printing press, the resolution of the scanned image may be constrained by the scanner used and/or the processing power available to detect defects. For example, the scanner may be configured to produce images having a resolution of 150 dot per inch (DPI) in a red, blue, green (RBG) color space. In order to reliably compare the scanned image with a reference image, the reference image may be generated to conform to this.

Figure 1:
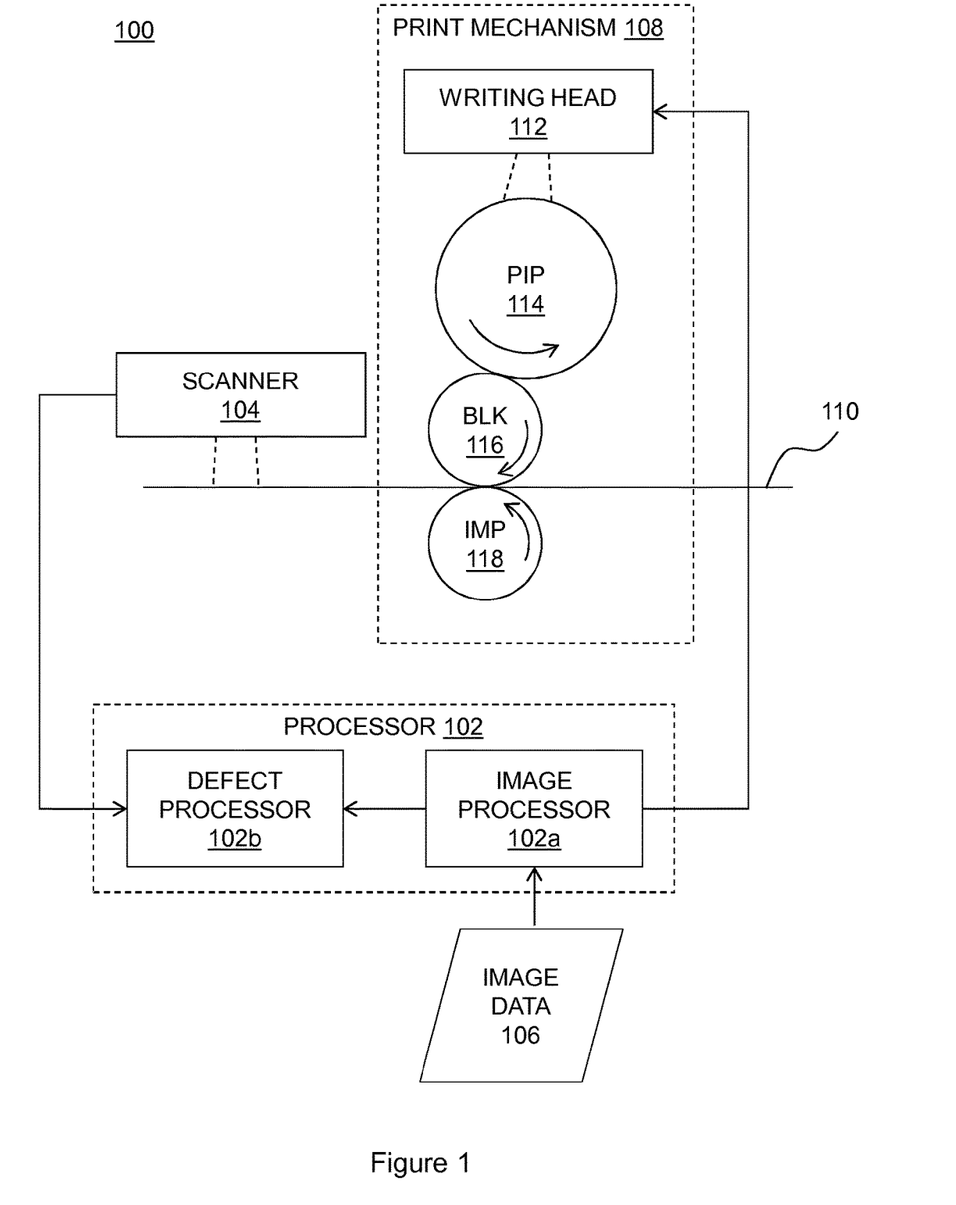
FIG. 1 is a schematic diagram of an apparatus to detect a defect in a printed image according to an example.

FIG. 1 shows an apparatus 100 to detect a defect in a printed image according to an example. The apparatus comprises a processor 102 and a scanner 104.

FIG. 1, as well as other figures referenced herein, are schematic diagrams and as such certain components have been omitted to facilitate a description of the example. Actual implementations may vary in different examples.

Throughout this disclosure reference is made to printed images. Such images may include text, graphics, photographs and any other representation in which a defect may be detected.

In some examples, the processor 102 receives image data 106 representing a printable image. The processor 102 may initiate a printing operation using the image data 106. In an example, the processor 102 may generate an instruction or set of instructions that are transmitted to a print mechanism 108. Upon receipt of such an instruction or instructions, the print mechanism 108 may generate a printed image on a print medium 110.

In some examples, the processor 102 may include plural processing sections. In an example, the processor comprises an image processor 102a and a defect processor 102b. The image processor 102a may be responsible for processing tasks relating to printing images, such as processing image data 106 to generate instructions for transmission to the print mechanism 108, and initiating printing operations. The defect processor 102b may be responsible for processing tasks relating to detecting defects in a printed image. Tasks disclosed herein as being done by the processor 102 may be performed by the image processor 102a or the defect processor 102b. The image processor 102a and the defect processor 102b may be implemented in a single processing component or in plural processing components.

The scanner 104 may be any device capable of converting an image printed on a print medium 110 to digital image data. In an example, the scanner 104 is an inline scanner. For example, the scanner 104 may comprise a charge-coupled device (CCD) or a contact image sensor (CIS).

The print mechanism 108 may be any print mechanism capable of producing a printed image. In an example the print mechanism is part of a web press. In one example, the print mechanism 108 comprises a writing head 112, a photo imaging plate (PIP) 114, a blanket cylinder 116, and an impression cylinder 118. The print mechanism 108 illustrated in FIG. 1 corresponds generally to that of an offset lithographic printer such as the HP Indigo liquid electrophotographic printing system. However, it will be appreciated that the print mechanism 108 is provided for illustrative purposes, and that any suitable mechanism for printing an image from image data may be used (e.g. a laser printer, an inkjet printer, a dye-sublimation printer, or the like).

The print mechanism 108 may generate a printed image on the print medium 110 as follows. In accordance with instructions received from the processor 102, the writing head 112 writes a pattern corresponding with a printable image on to the PIP 114. In an example, the writing head 112 controls lasers according to instructions received from the processor 102 in the form of a digital image file. The lasers create a latent image in the charged surface of the PIP. The instructions according to which the writing head 112 controls the lasers may comprise: image color, image spacing, image intensity, order of the color layers, or a combination thereof. Printing fluid may be applied to the PIP 114, for example, from a Binary Ink Developer unit (not shown). The printing fluid contains electrically charged pigment particles which are attracted to the opposing electrical fields on the image areas of the PIP 114. The printing fluid is repelled from the uncharged, non-image areas of the PIP 114. The PIP 114 is in contact with the blanket cylinder 116 such that as the PIP 114 rotates in one sense, the blanket cylinder 116 rotates in the opposite sense. As the PIP 114 and the blanket cylinder 116 rotate, the printing fluid image on the PIP 114 is transferred to the blanket cylinder 116. The print medium 110 is able to pass between the blanket cylinder 116 and the impression cylinder 118. As the print medium 110 passes between the rotating blanket cylinder 116 and the counter-rotating impression cylinder 118, the impression cylinder 118 and the blanket cylinder 116 apply pressure to the print medium 110 so that the printing fluid image previously transferred from the PIP 114 to the blanket cylinder 116 is transferred to the print medium 110. To create images containing plural colors, the print medium 100 may make plural passes through the print mechanism 108 with a different color plane being applied to the print medium 110 during each pass.

The print medium 110 may be any material suitable for printing such as, amongst others, plain paper, glossy paper, coated paper, transparencies, polymers, metal foils, or the like. The print medium 110 may be fed on a per sheet basis or from a roll, which is sometimes referred to as a web substrate. In certain examples, the print medium may be a paper substrate comprising a web formed from cellulosic fibers, having a basis weight of from about 75 gsm to about 350 gsm, and a caliper (i.e. thickness) of from about 4 mils (thousandths of an inch—around 0.1 millimeters) to about 200 mils (around 5 millimeters). In some examples, the print medium 110 may be a layer of powder in a 3D printing system.

Once a printed image has been generated on the print medium 110, the print medium 110 may exit the print mechanism 108 and pass the scanner 104. The scanner 104 may generate a scanned image of the printed image. In particular, the scanner may generate image data representing the scanned image of the printed image.

Figure 2:
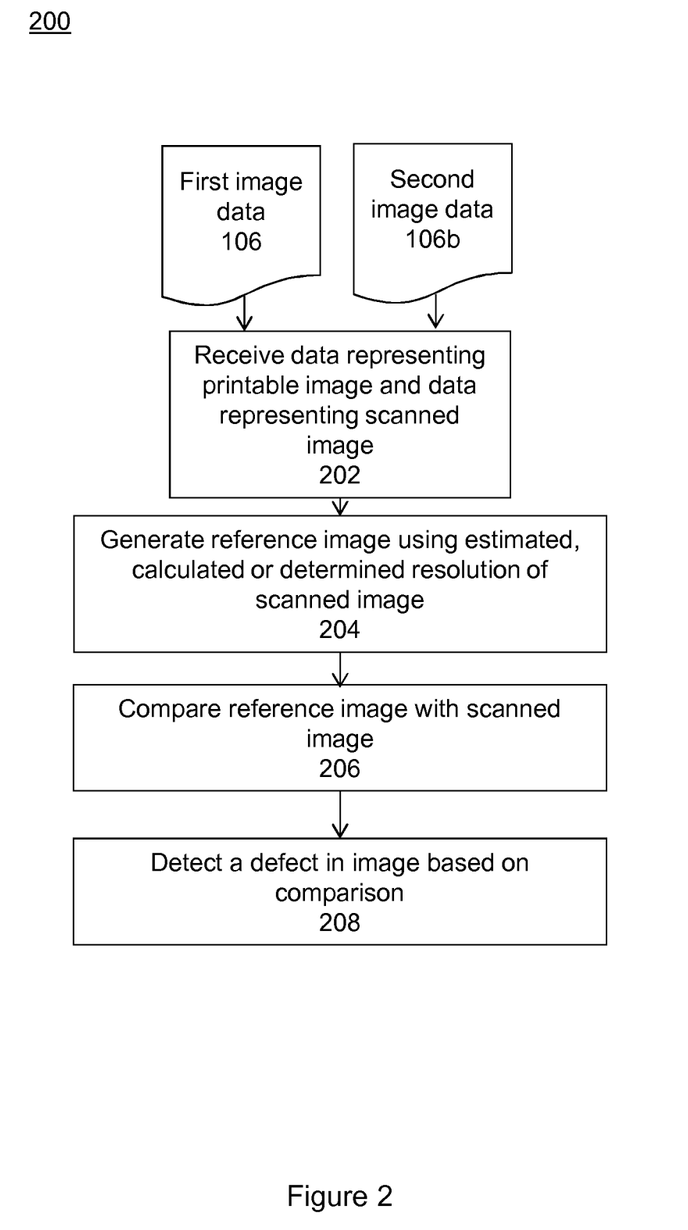
FIG. 2 is a flow diagram showing a method of detecting a defect in a printed image according to an example.

FIG. 2 is a flow diagram showing a method 200 of detecting a defect in a printed image according to an example. The method 200 is described herein as being performed by the apparatus 100 shown in FIG. 1. However, the method may be performed by any suitable apparatus, such as apparatus including a print mechanism different to that described with reference to FIG. 1. In some examples, the method 200 may be performed by apparatus not including a print mechanism itself but which may be used in conjunction with a print mechanism.

At block 202, the processor 102 receives first image data 106 representing a printable image and receives second image data 106b representing a scanned image of the printable image printed in a printing operation carried out by the print mechanism 108. In an example, the first image data 106 may be received by the image processor 102a and the second image data 106b may be received by the defect processor 102b.

At block 204, reference image data 106c representing a reference image is generated using the first image data 106. The reference image is generated to have a resolution substantially corresponding to an estimated, calculated or determined resolution of the scanned image.

The resolution of the scanned image may be estimated, calculated or determined on the basis of a characteristic of the printing operation in which the printable image was printed. In the illustrative apparatus described with reference to FIG. 1, the print mechanism 108 may support variable data printing to a web substrate. Variable data printing is a form of digital printing in which elements such as text, graphics and images may be changed from one printed piece to the next without stopping or slowing down the printing process. In contrast to a scanned image of an image printed on a sheet substrate, the resolution of a scanned image of an image printed in a continuous web-fed press cannot be fixed without disrupting the printing process. For a scanner sampling at a fixed rate, the scanning resolution varies according to the speed at which the print medium 110 passes the scanner 104, which is related to the speed at which the print medium 110 passes through the print mechanism 108. This speed is determined by factors such as a length of the image, a number of color planes in the image, a time taken to print each of the color planes, and a scan line duration (that is, the time taken to scan one line of the scanned image).

In an example, the speed, V, at which the print medium 110 passes through the print mechanism 108 may be determined according to the formula:

$$V = \frac{\text{image length (inches)}}{\text{color plane print time} \times \text{number of color planes}}.$$

The resolution, DPI, of the scanned image may be determined according to the formula:

$$DPI = \frac{1}{V \times \text{scan line duration}}.$$

In other examples, the characteristic of the printing operation may be a characteristic other than the speed at which the print medium 110 passes through the print mechanism 108.

Estimating, calculating or determining the resolution of the scanned image and generating a reference image having a resolution substantially corresponding to the resolution of the scanned image, helps to more accurately compare a scanned image of an image printed in a variable data print web-fed printing press with the reference image.

At block 206, the reference image generated to have a resolution substantially corresponding to an estimated, calculated or determined resolution of the scanned image, is compared with the scanned image. On the basis of this comparison, it can be determined whether a defect is present in the image printed in the printing operation.

Figure 3:
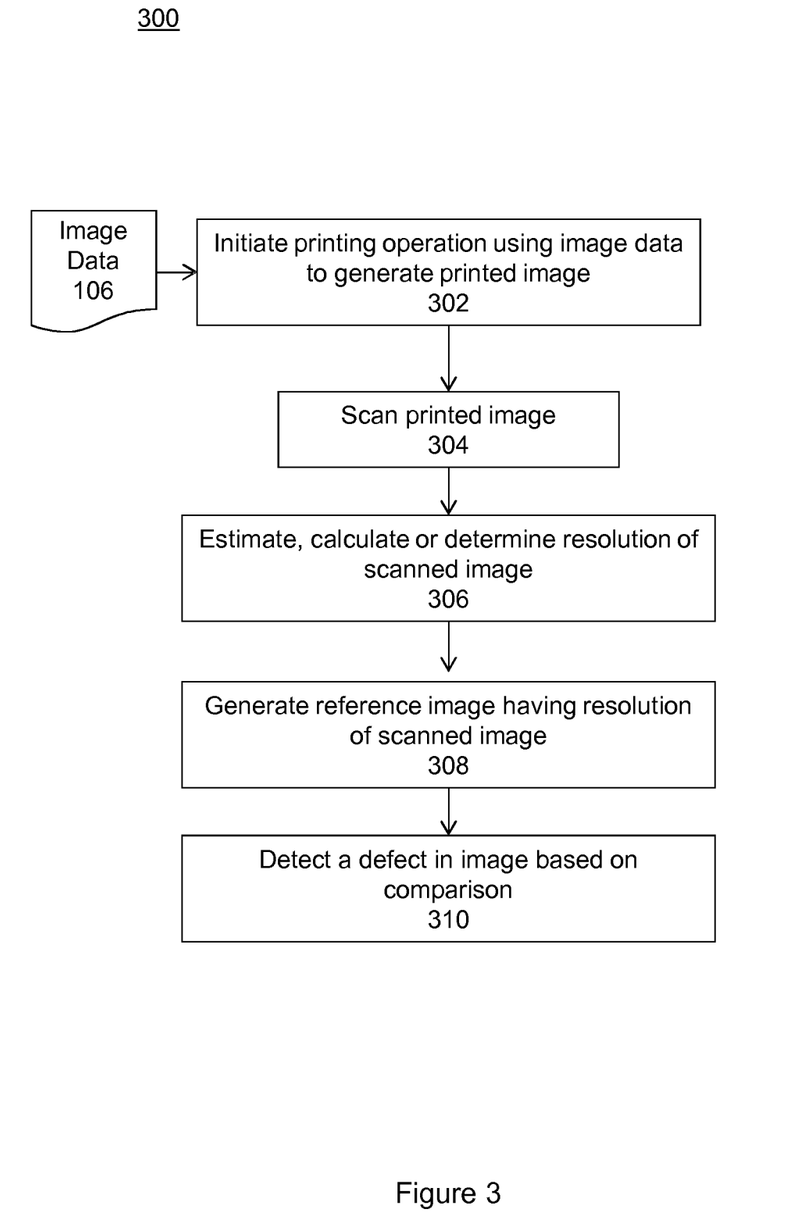
FIG. 3 is a flow diagram showing a method of detecting a defect in a printed image according to an example.

FIG. 3 is a flow diagram showing a method 300 of detecting a defect in a printed image according to an example. Again, the method 300 is described herein as being performed by the apparatus 100 shown in FIG. 1. However, the method may be performed by any suitable apparatus, such as an apparatus including a print mechanism different to that described with reference to FIG. 1.

At block 302, the processor 102 initiates a printing operation using image data 106 to generate a printed image. For example, the image processor 102a may, as described above with reference to FIG. 1, process the image data 106 to generate instructions for transmission to the print mechanism 108, and initiate such a printing operation.

At block 304, the scanner 104 scans the printed image to generate a scanned image.

At block 306, the processor 102 estimates, calculates or determines a resolution of the scanned image on the basis of a characteristic of the printing operation. The resolution of the scanned image may be estimated, calculated or determined as described above with reference to the method 200 shown in the flow diagram of FIG. 2.

In an example, the image processor 102a estimates, calculates or determines the resolution of the scanned image using a characteristic, or characteristics, of the printing operation. For example, the image processor 102a may determine, from instructions generated for transmission to the printing mechanism 108, a characteristic or characteristics of the printing operation that will determine the resolution of the scanned image, and may determine the resolution of the scanned image on the basis of those characteristic(s).

In another example, the defect processor 102b may estimate, calculate or determine the resolution of the scanned image using a characteristic, or characteristics, of the printing operation. For example, the image processor 102a may make available to the defect processor 102b information relating to the characteristic or characteristics of the printing operation. Alternatively, the instructions generated by the image processor 102a for transmission to the print mechanism 108, may be made available to the defect processor 102b, which may determine the characteristic(s) of the printing operation from the instructions. In a further example, a processor in the print mechanism 108 may determine the characteristic(s) of the printing operation and transmit a signal indicative of the characteristic(s) to the processor 102, such as to the defect processor 102b. In any event, the processor 102 may estimate, calculate or determine the resolution of the scanned image.

At block 308, the processor 102 generates a reference image from the image data 106. The reference image is generated to have a resolution substantially corresponding to the estimated, calculated or determined resolution of the scanned image.

In an example, the reference image is generated by the image processor 102a. In another example, the reference image is generated by the defect processor 102b.

At block 310, the processor 102 compares the reference image with the scanned image to determine whether a defect is present in the printed image.

In an example, the comparison is performed by the defect processor 102a.

Figure 4:
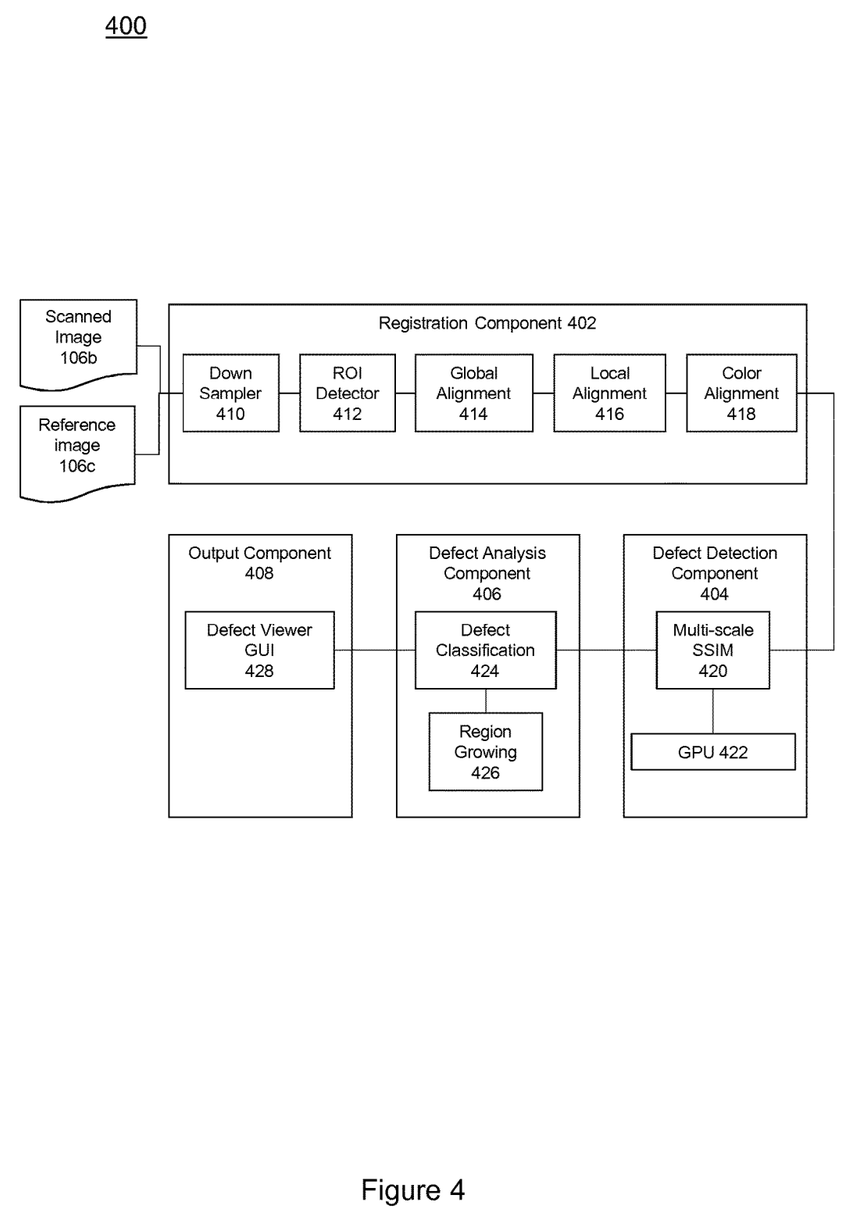
FIG. 4 is a schematic diagram of components of an apparatus according to an example.

FIG. 4 is a schematic diagram illustrating functional components of an apparatus 400 to detect a defect in a printed image in accordance with an example. These components may be implemented by the processor 102, the image processor 102a, the defect processor 102b, or a combination of the image processor 102a and the defect processor 102b.

In this example, the components include a registration component 402, a defect detection component 404, an analysis component 406 and an output component 408.

In this example, the registration component 402 comprises a down sampler 410, a region of interest (ROI) detector 412, a global alignment component 414, a local alignment component 416, and a color alignment component 418.

In some examples, the down sampler 410 generates the reference image using an estimated, calculated or determined resolution of scanned image. As described above with reference to FIG. 3, the reference image may be generated to have the same resolution as the estimated, calculated or determined resolution of the scanned image. In some examples, the down-sampler 410 further down-samples the scanned image and the reference image to produce lower resolution versions of the scanned image and the reference image.

In this example, the defect detection component 404 comprises a multi-scale SSIM (Structural Similarity Index Method) component 420 and a graphics processing unit (GPU) component 422.

In this example, the analysis component 406 comprises a defect classification component 424 and a region growing component 426.

In this example, the output component 408 comprises a defect viewer graphical user interface (GUI) 428.

Figure 5:
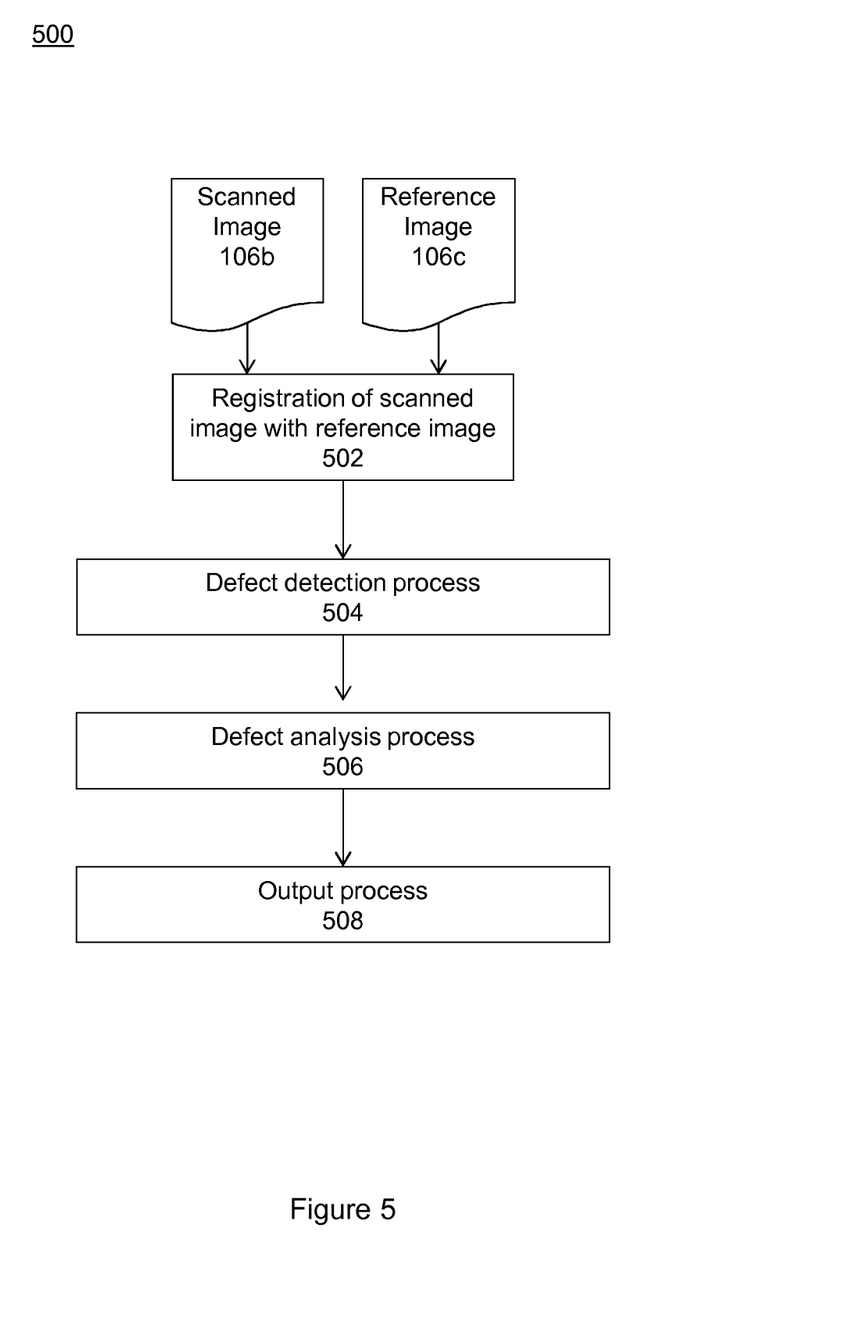
FIG. 5 is a flow diagram showing a method of detecting a defect in a printed image according to an example.

FIG. 5 is a flow diagram showing a method 500 performed by the functional components depicted in FIG. 4, in accordance with an example. In other examples, the method may be performed by any processor and could be implemented by apparatus other than that shown in FIG. 4.

At block 502, the registration component 402 performs a registration process to align the scanned image with the reference image. A registration process according to an example is described below with reference to FIG. 6.

At block 504, the defect detection component 404 performs a defect detection process by comparing the scanned image with the reference image. In an example, the defect detection component 404 may produce a defect map.

In an example, the defect detection function implements a structural similarity information measure (SSIM) on a pixel-by-pixel basis. The SSIM is based on the precept that every region in the scanned image should have a similar region nearby in the reference image, unless it contains a defect. SSIM is designed to improve on traditional methods like peak signal-to-noise ratio (PSNR) and mean squared error (MSE), which have proven to be inconsistent with human eye perception. SSIM assigns a similarity value, S, to each pixel according to the formula:

$$S(\vec{x},\vec{y})=f(l(\vec{x},\vec{y}),c(\vec{x},\vec{y}),s(\vec{x},\vec{y})) \qquad (1)$$

where $\vec{x}$ and $\vec{y}$ are image signals corresponding to a target region in the target image and a reference region in the reference image respectively. The SSIM has three components: a luminance measure, l, which compares the mean values of the two regions; a contrast measure, c, which compares the standard deviation of the two regions, and a structural measure, s, which compares the correlation of the two regions. These three measure are based on properties of the image pair, including the signal mean, $\mu_x$:

$$\mu_x = \frac{1}{N}\sum_{i=1}^{N} x_i \qquad (2)$$

the signal standard deviation, $\sigma_x$:

$$\sigma_x = \left(\frac{1}{N-1}\sum_{i=1}^{N}(x_i-\mu_x)^2\right)^{\frac{1}{2}} \qquad (3)$$

and a signal cross correlation, $\sigma_{xy}$:

$$\sigma_{xy} = \left( \frac{1}{N-1} \sum_{i=1}^{N} (x_i - \mu_x)(y_i - \mu_y) \right)^{\frac{1}{2}} \quad (4)$$

where summations are over all pixels in the relevant regions and N is the total number of pixels in a region. Based on these properties, the luminance measure, l, is defined as:

$$l(\vec{x}, \vec{y}) = \frac{2\mu_x \mu_y + C_1}{\mu_x^2 + \mu_y^2 + C_1} \quad (5)$$

where $C_1$ is a constant. The contrast measure, c, is defined as:

$$c(\vec{x}, \vec{y}) = \frac{2\sigma_x \sigma_y + C_2}{\sigma_x^2 + \sigma_y^2 + C_2} \quad (6)$$

where $C_2$ is a constant. Finally, the structure measure, s, is defined as:

$$s(\vec{x}, \vec{y}) = \frac{2\sigma_{xy} + C_3}{\sigma_x \sigma_y + C_3} \quad (7)$$

where $C_3$ is a constant. The constant $C_1$, may take a standard value [6] according to:

$$C_1 = (K_1 L)^2 \quad (8)$$

where L is the dynamic range of the pixel values (255 for 8-bit grayscale images), and $K_1 \ll 1$ is a small constant. Constant $C_2$ may take a value according to:

$$C_2 = (K_2 L)^2 \quad (9)$$

where $K_2 \ll 1$ is also a small constant. Finally, $C_3$ may take the value:

$$C_3 = C_2/2 \quad (10)$$

The various constants may be varied as appropriate for a particular application or image type. Such variation falls within the scope of the present application, as defined by the appended claims.

In another example, a multi-scale SSIM is performed in relation to the reference and scanned images. In order to perform the multi-scale SSIM, the down sampler 410 may generate plural down-sampled versions of the reference and scanned images. In particular, the down sampler 410 may generate a series of pairs of scanned and reference images, each pair having a different resolution. For each of the pairs of scanned and reference images, the defect detection component 404 (and in particular the multi-scale SSIM component 420) performs SSIM and determines similarity measures for each patch of each image, the patches containing varying numbers of pixels dependent on the resolution of the image. That is, each patch in the scanned image receives a score that represents its similarity to the corresponding patch in the reference image. Performing SSIM on pairs of images with different resolutions improves the detection rate of defects, as defects of different sizes are detected more readily at different resolutions. For example, a larger defect may be more easily detected in a relatively lower resolution image, while a relatively smaller defect may be more easily detected in a relatively higher resolution image. Performing SSIM on plural pairs of images also increases robustness of detection in relation to any remaining misalignment of the scanned image with the reference image.

In some examples, lower resolution images are processed by the processor 102 and relatively higher resolution images are processed by the GPU 422. This enables the processing power utilized by the processor 102 to be reduced (by using the processing power of the GPU 422 to perform the more computationally intensive processing) so that the processing power of the processor 102 can be utilized for other processing needs.

At block 506, the defect analysis component 406 analyses defects detected by the defect detection component 404. In an example, the defect analysis component 406 may analyze the defect map produced by the defect detection component 404 to determine if a defect is present in the image. In some examples, the defect analysis component 406 may also determine the nature and/or cause of the defects and/or may determine an appropriate course of action to correct or eliminate the defect. In some examples, the course of action may include halting the printing operation and/or alerting an operator. Alternatively or additionally, the defect analysis component 406 may keep a log of defects for maintenance scheduling and determining whether an equipment problem is imminent.

As described above, in some examples, every defect that is detected may be stored in a defect map (referred to hereafter as an SSIM map). In some examples, each defect in the SSIM map is analyzed to characterize the defect and/or determine whether the detected defect is a false alarm. In some examples, defects that are identified following the SSIM analysis are further analyzed using a machine learning tool. The machine learning tool may be configured to learn common artefacts that may result in false detections of defects. For example, artefacts introduced by the scanner, such as moiré, noise, and illumination inconsistency may be recognized by the machine learning tool and subsequently ignored. This helps to reduce false alarms.

In some examples, a region growing process is performed in order to identify features in the scanned image. The region growing process may involve identifying a seed pixel satisfying a criterion. For example, a seed pixel may be identified on the basis of a comparison with a threshold intensity value. For an identified seed pixel, pixels near to or adjacent to the seed pixel may be evaluated for their similarity to the seed pixel. For example, pixels that are near to or adjacent to the seed pixel that have an intensity value within a predetermined range of the intensity value of the seed pixel may be determined within a same region as the seed pixel. The evaluation of pixels adjacent to the region may be repeated until no more pixels meet the comparison criterion. In this way, the scanned and reference images are partitioned into regions, each region containing a possible defect. This effect of this is to provide a simplified representation of regions containing possible defects to display to the user, which provides an image in which the user can more easily view defects.

At block 508, the output component 408 provides an output indicating the results of the defect analysis. In some examples, the results of the defect analysis are presented to a user of the apparatus 100 using the defect viewer GUI 428. In some examples, one or both of the scanned image and the reference image is presented to the user. In some examples, the defect viewer GUI 428 indicates a detected defect in the scanned image and/or the reference image displayed to the user. In an example, the defect viewer GUI 428 overlays an outline around the detected defect. For example, the defect viewer GUI 428 may highlight a detected defect by overlaying a red box around the detected defect.

Figure 6:
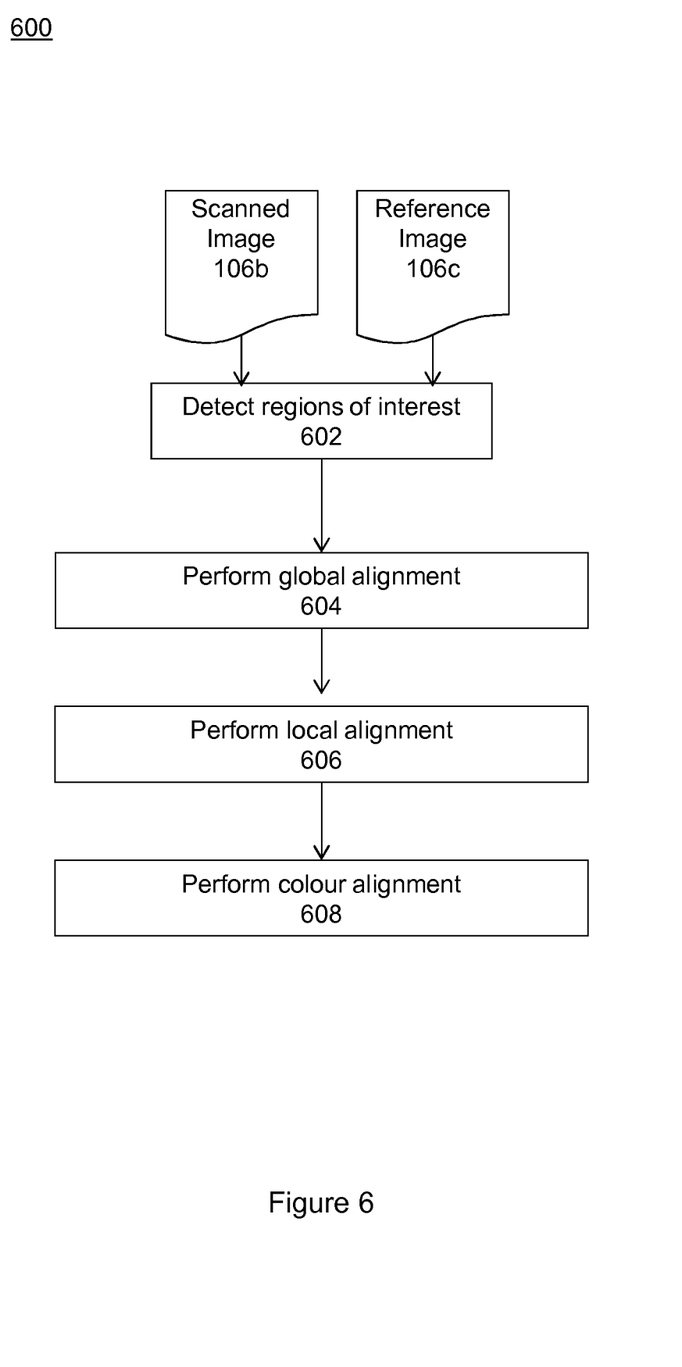
FIG. 6 is a flow diagram showing a method of registration of a scanned image with a reference image.

FIG. 6 shows a registration process 600 according to an example. The registration process 600 may be performed by, for example, the registration component 402 described above with reference to FIG. 4.

At block 602, the registration component 402 detects a region or regions of interest (ROIs) in one or both of the reference image and the scanned image.

The ROIs may, for example, be regions of the image including distinctive features. The distinctive features may be easily identifiable features that may be easily distinguishable from other features is the image.

In an example, the ROIs may be detected using a feature detection process. For example, the ROIs may be detected using an Oriented Features from Accelerated Segment Test (FAST) and Rotated Binary Robust Independent Elementary Features (BRIEF) (ORB) process, a Speeded Up Robust Features (SURF) process, a Scale-invariant Feature Transform (SIFT) process, a mean-shift clustering process, or a combination thereof.

The registration component 402 may, in some examples, determine whether a number of ROIs meets or exceeds a threshold value. The threshold number of ROIs may be selected to ensure that sufficient ROIs are present to align the scanned image with the reference image. In such examples, the registration component 402 may be to continue with the registration process 502 if the number of detected ROIs meets or exceeds the threshold value.

At block 604, the registration component 402 performs a global alignment process. The global alignment process may provide a coarse alignment between the scanned image and the reference image.

In some examples, to reduce the complexity of this task so as to enable the process to be performed in real time on a web press which may operate at a variable speed, a portion of the image in which ROIs are present is selected for the global alignment process.

In performing the global alignment process, an angle of rotation, a translation, or a scaling, of the scanned image may be performed to align the features of the scanned image with those of the reference image. In an example, for each of the ROIs, a transformation between corresponding features in the scanned image and the reference image is calculated. In an example, each occurrence of the transformation supplements a measure of a rank of that transformation over all transformations. Accordingly, the transformation with the highest rank, which is to say the transformation with the largest number of occurrences over all pairs of corresponding features, defines a global transformation which is applied to the whole scanned image to geometrically transform the scanned image so that it can be registered or aligned with the reference image. The number of occurrences of a transformation provides a measure of the accuracy of the transformation in providing a global transformation for the scanned image, such that a larger number of occurrences indicates a higher measure of accuracy.

At block 606, a local alignment process is performed. In an example, the local alignment process uses a Block Matching Algorithm in which the scanned image is divided into a number of non-overlapping blocks. Local alignment transformations are then determined for each of the blocks. For example, the scanned image may be divided into fifteen non-overlapping blocks. In other examples, the scanned image may be divided into fewer than fifteen or more than fifteen blocks. In one example, local template matching is performed based on an "Adaptive Root Pattern Search" algorithm.

Performing the local alignment process in addition to the global alignment process provides an alignment process that is robust against inconsistent movement of the print medium 110 (for example, due to inconsistencies in print medium handling) by providing localized correction to the global alignment. However, in some examples, one or other of the global alignment and local alignment processes may be used.

At block 608, a color matching process is performed to match the colors appearing in the scanned image with those appearing in the reference image. In an example, a color histogram of the regions of interest in the scanned and reference image are calculated to establish a difference between a color distribution of the scanned image and a color distribution of the reference image (which may be due to artefacts of the scanning process). Colors appearing in the scanned image may be adjusted to account for this difference.

At this stage, the processor 102 has two processed images in substantially the same color space and substantially the same resolution—the reference image corresponding to the original image data 106, and the scanned image corresponding to a scan of the printed image.

The processing of the image data to produce the reference image may be performed by either the image processor 102a, or the defect processor 102b. In some examples, an additional dedicated processor may be employed to process the scanned and reference images prior to them being received by the defect processor 102b.

Although the above examples are described with reference to a digital offset print press, the principles could equally be applied to other printers, such as scanning printers and page wide array printers.

Any feature described in relation to any one example may be used alone, or in combination with other features described, and may also be used in combination with a feature or features of any other of the examples, or any combination of any other of the examples. Furthermore, equivalents and modifications not described above may also be employed.

What is claimed is:

1. An apparatus to detect a defect in a printed image, the apparatus being to:
  receive, by a processor, first image data representing a printable image;
  receive, by the processor, second image data representing a scanned image of the printable image printed in a printing operation;
  determine, by the processor, a resolution of the scanned image, the resolution of the scanned image being variable based on a characteristic of the printing operation;
  generate, by the processor, a reference image using the first image data, the reference image having a resolution corresponding to the determined resolution of the scanned image; and
  determine, by the processor, whether a defect is present in the image printed in the printing operation based on a comparison of the reference image with the scanned image.

2. The apparatus according to claim 1, wherein the characteristic of the printing operation is a speed at which printed print medium passes through a print mechanism in the printing operation, the resolution of the scanned image being variable based on the speed.

3. The apparatus according to claim 1, wherein the apparatus is to align the scanned image with the reference image by detecting a region of interest in each of the scanned image and the reference image and determining a transformation of the scanned image based on the regions of interest.

4. The apparatus according to claim 3, wherein the apparatus is to detect the regions of interest using an Oriented Features from Accelerated Segment Test (FAST) and Rotated Binary Robust Independent Elementary Features (BRIEF) (ORB) process, a Speeded Up Robust Features (SURF) process, a Scale-invariant Feature Transform (SIFT) process, a mean-shift clustering process, or a combination thereof.

5. The apparatus according to claim 1, wherein the apparatus is to detect a defect in the image printed in the printing operation using a structural similarity information measure.

6. The apparatus according to claim 5, wherein the apparatus is to generate down-sampled versions of the scanned image and of the reference image, and to generate a structural similarity information measure for the down-sampled versions of the scanned image and of the reference image.

7. An apparatus to detect a defect in a printed image, the apparatus comprising:
a processor to initiate a printing operation using image data to generate a printed image; and
a scanner to scan the printed image to generate a scanned image;
wherein the processor is to:
determine a resolution of the scanned image, the resolution of the scanned image being variable based on a characteristic of the printing operation;
generate a reference image using the image data, the reference image having a resolution corresponding to the determined resolution; and
compare the reference image with the scanned image to determine whether a defect is present in the printed image.

8. The apparatus according to claim 7, comprising a registration component to align the scanned image with the reference image.

9. The apparatus according to claim 8, wherein the registration component is to detect a region of interest in each of the scanned image and the reference image and determine a transformation of the scanned image based on the regions of interest.

10. The apparatus according to claim 7, wherein the processor comprises:
an image processor to receive first image data representing a printable image and to initiate the printing operation using the first image data; and
a defect processor to receive second image data representing the scanned image.

11. The apparatus according to claim 10, wherein the defect processor is to receive the first image data and to generate the reference image using the first image data and the characteristic of the printing operation.

12. The apparatus according to claim 7, wherein the processor is to identify an artefact in the scanned image that represents a false defect detection.

13. The apparatus according to claim 7, wherein the characteristic of the printing operation is a speed at which printed print medium passes through a print mechanism in the printing operation, the resolution of the scanned image being variable based on the speed.

14. A method of detecting a defect in a printed image, the method comprising:
initiating, by a processor, a printing operation using image data to generate a printed image;
scanning, by a scanner, the printed image to generate a scanned image;
determining, by the processor, a resolution of the scanned image, the resolution of the scanned image being variable based on a characteristic of the printing operation;
generating, by the processor, a reference image from the image data, the reference image having a resolution corresponding to the determined resolution of the scanned image; and
detecting, by the processor, a defect in the printed image based on a comparison of the reference image with the scanned image.

15. The method according to claim 14, comprising aligning the scanned image with the reference image using a global alignment process and/or a local alignment process.

16. The method according to claim 14, wherein the printing operation comprises printing the printed image using a web press.

17. The method according to claim 14, wherein the characteristic of the printing operation is a speed at which printed print medium passes through a print mechanism in the printing operation, the resolution of the scanned image being variable based on the speed.

* * * * *

UNITED STATES PATENT AND TRADEMARK OFFICE
CERTIFICATE OF CORRECTION

PATENT NO. : 10,404,868 B2  
APPLICATION NO. : 15/569262  
DATED : September 3, 2019  
INVENTOR(S) : Alexander Spivakovsky et al.

Page 1 of 1

It is certified that error appears in the above-identified patent and that said Letters Patent is hereby corrected as shown below:

On the Title Page

In Column 1, item (72), Inventors, Line 4, delete "Pethch Tikva" and insert -- Petah Tikva --, therefor.

In Column 2, item (57), Abstract, Line 2, delete "detects" and insert -- defects --, therefor.

Signed and Sealed this  
Fourteenth Day of January, 2020

Andrei Iancu  
*Director of the United States Patent and Trademark Office*